United States Patent
Gray

(10) Patent No.: US 10,252,236 B2
(45) Date of Patent: Apr. 9, 2019

(54) ANNULAR CATALYST CARRIER CONTAINER FOR USE IN A TUBULAR REACTOR

(71) Applicant: Johnson Matthey Davy Technologies Limited, London (GB)

(72) Inventor: Julian Gray, London (GB)

(73) Assignee: Johnson Matthey Davy Technologies Limited, London, England (GB)

( * ) Notice: Subject to any disclaimer, the term of this patent is extended or adjusted under 35 U.S.C. 154(b) by 0 days.

(21) Appl. No.: 15/509,163

(22) PCT Filed: Sep. 16, 2015

(86) PCT No.: PCT/EP2015/071269
§ 371 (c)(1),
(2) Date: Mar. 6, 2017

(87) PCT Pub. No.: WO2016/050520
PCT Pub. Date: Apr. 7, 2016

(65) Prior Publication Data
US 2017/0232415 A1    Aug. 17, 2017

(30) Foreign Application Priority Data
Oct. 2, 2014 (GB) .................................. 1417462.7

(51) Int. Cl.
*B01J 8/06*      (2006.01)
*B01J 8/02*      (2006.01)
*B01J 8/00*      (2006.01)
*B01J 8/04*      (2006.01)

(52) U.S. Cl.
CPC .......... *B01J 8/0214* (2013.01); *B01J 8/0015* (2013.01); *B01J 8/0415* (2013.01); *B01J 8/06* (2013.01); *B01J 8/067* (2013.01); *B01J 2208/00814* (2013.01); *B01J 2208/06* (2013.01)

(58) Field of Classification Search
CPC .................................. B01J 8/0214; B01J 8/06
USPC ......................................................... 422/218
See application file for complete search history.

(56) References Cited

U.S. PATENT DOCUMENTS

| | | | |
|---|---|---|---|
| 2,646,391 A | 7/1953 | Houdry | |
| 4,283,368 A | 8/1981 | Harada et al. | |

FOREIGN PATENT DOCUMENTS

| | | |
|---|---|---|
| EP | 1 394 528 A2 | 3/2004 |
| EP | 2 514 523 A1 | 10/2012 |
| FR | 2 413 925 A2 | 8/1979 |
| WO | 2011048361 A1 | 4/2011 |
| WO | 2012136971 A1 | 10/2012 |
| WO | WO2012/146902 A1 | 11/2012 |

(Continued)

OTHER PUBLICATIONS

International Search Report issued in International Application No. PCT/EP2015/071269 dated Dec. 7, 2015.

(Continued)

*Primary Examiner* — Huy Tram Nguyen
(74) *Attorney, Agent, or Firm* — BakerHostetler

(57) ABSTRACT

In a catalyst carrier for insertion in a reactor tube of a tubular reactor, the catalyst carrier includes a container for holding catalyst in use. The container has a bottom surface closing the container, and a top surface. A carrier outer wall extends from the bottom surface to the top surface. A seal extends from the container by a distance which extends beyond the carrier outer wall. The carrier outer wall has apertures located below the seal.

10 Claims, 4 Drawing Sheets

(56) References Cited

FOREIGN PATENT DOCUMENTS

| WO | WO2012/146903 A1 | 11/2012 |
| WO | WO2012/146904 A1 | 11/2012 |
| WO | WO2012/173731 A2 | 12/2012 |

OTHER PUBLICATIONS

Written Opinion and International Preliminary Report on Patentability issued in International Application No. PCT/EP2015/071269 dated Jan. 25, 2017.
Great Britain Patent Application No. GB1401518.4.

ated by The Dow Chemical Company. Alternatively the heat transfer
ANNULAR CATALYST CARRIER CONTAINER FOR USE IN A TUBULAR REACTOR The present invention relates to a catalyst carrier for use in a tubular reactor and to processes carried out using the catalyst carrier. More particularly, it relates to a catalyst carrier for use in a tubular reactor in which an exothermic or an endothermic reaction is to be carried out. Still more particularly, it relates to a catalyst carrier for use in a reactor for carrying out an exothermic or endothermic reaction comprising a plurality of said catalyst carriers.

Conventional, so-called fixed bed tubular, reactors comprise a reactor shell containing a plurality of tubes, which are usually cylindrical, and which are usually filled with catalyst particles. In use, a heat transfer medium flows through the shell of the reactor outside these tubes and thereby adjusts the temperature of the catalyst in the tubes by heat exchange across the tube wall. Thus, where the reaction is an exothermic reaction, the heat transfer medium will allow heat to be removed from the catalyst and where the reaction is an endothermic reaction, the heat transfer medium will provide heat to the catalyst. Examples of heat transfer mediums include cooling water, boiler feed water and heat transfer oils such as that sold under the trade mark Dowtherm by The Dow Chemical Company. Alternatively the heat transfer fluid is in the form of a molten salt mixture. During operation, gas, liquid, or both gas and liquid reactants flow through the tubes over the catalyst particles such that the desired reaction takes place.

For some reactions, the heat effects of the reaction are moderate such that they are either not problematic or they can be readily managed. In some cases, the heat effects are sufficiently small that large-diameter tubes may be used. This has the benefit that there is a large volume of catalyst within the tube. However, for more exothermic reactions it is necessary that there is efficient heat transfer via the tube wall to the heat transfer medium to enable the conditions within the reactor to be controlled. To achieve the desired efficiency, the surface area of the tube wall per unit length has to be maximised. This is achieved by installing a greater number of smaller diameter tubes. The use of this multiplicity of tubes increases the cost and complexity of the reactor.

Tubular reactors in which moderate to highly exothermic reactions take place are in many cases, heat transfer limited. One disadvantage of this is that the benefits of more active catalysts are difficult to realise since the increased productivity achievable with these catalysts generates increased amounts of heat which must be removed at a rate that maintains a stable operating temperature to avoid detrimental effects occurring such as side reactions taking place, damage to the catalyst such as by sintering of the catalytic active sites, and, in the worst case, thermal runaway. Where the reaction is a moderate to highly exothermic reaction, various problems can arise with this increased heating and in some systems the heat can be such that the catalyst can fail and even damage to the tube wall can occur.

Where the reaction is a moderate to highly exothermic reaction, problems can arise with increased heating and in some systems damage to the tube wall can occur, for example uneven heating can result in temperature hot spots on the tube wall.

Conventional reactors have a number of drawbacks that make them less than ideal. One problem that is noted for these reactors is that in order to extract the heat of reaction effectively the tubes have to be relatively small in diameter to ensure that the central region of the tube remains cool enough to avoid the problems detailed above occurring.

Similar, albeit converse problems, will be noted where the reaction is an endothermic reaction. In order for the heat to be provided such that the catalyst can continue to operate in the optimum manner, the tubes have to be relatively small in diameter to ensure that the central region of the tube is heated sufficiently.

In some reactions, the size restriction means that the tubes are only of the order of about 15 to 40 mm internal diameter. The small size of the tube means that, in order to accommodate the required volume of catalyst in the reactor, a large number of tubes have to be used. However, this increased number of tubes increases the weight of the reactor and since there is generally a maximum size of reactor which can be shipped in terms of dimensions and weight, the productivity of the reactor is limited.

A second problem is that the catalyst particles have to be a certain size, shape and strength so as not to cause an undue pressure drop for an appropriate tube length and in general this leads to the use of larger catalyst particles. However, the use of larger particles may be problematic where the reaction is mass, heat, or both mass and heat transfer limited, or both. Whilst some of these problems may be alleviated by ensuring that the active sites are only present near the surface of the catalyst particle, this can limit the productivity that can be achieved since the available active sites have to be worked harder to deliver a reasonable overall productivity. Whilst this may give reasonable productivity at a given time, it can reduce the life of the catalyst.

A further problem is that there is a limitation on the amount of heat that can be removed per unit surface area of the tube wall and this puts a limit on the amount of generated heat that can be tolerated per unit volume of catalyst contained within the tube.

In WO2011/048361 an alternative approach to packing catalyst in tubes is suggested in which a catalyst carrier device is configured to sit within the reactor tube. This arrangement optimises heat transfer at the tube wall such that larger tubes and larger volumes of smaller catalyst particles can be used. This arrangement allows the reactor to be operated at high productivity and with an acceptable pressure drop even where the reaction is highly exothermic.

The catalyst carrier described in WO 2011/048361 comprises:
  an annular container for holding catalyst in use, said container having a perforated inner wall defining a tube, a perforated outer wall, a top surface closing the annular container and a bottom surface closing the annular container;
  a surface closing the bottom of said tube formed by the inner wall of the annular container;
  a skirt extending upwardly from the perforated outer wall of the annular container from a position at or near the bottom surface of said container to a position below the location of a seal;
  and a seal located at or near the top surface and extending from the container by a distance which extends beyond an outer surface of the skirt.

Whilst these carriers offer substantial advantages over conventional packed tubes, they may suffer from some disadvantages and drawbacks for some applications. A particular problem may be attributed to the fact that the load bearing components of the carrier are the perforated inner and outer walls. When a plurality of filled carriers is packed in a tube, the weight of each packed carrier is supported by the perforated inner and outer walls of the carriers below.

Since in some arrangements there may be 80 or even more filled catalyst carriers in a tube the weight carried by the carriers located towards the base of the tube can be substantial.

This means that the perforated inner and outer walls of the container, the primary function of which is to retain the catalyst particles, have to be fabricated from materials which are stiff enough and strong enough not to buckle or otherwise distort under the load of the filled catalyst carriers located above it in the tube. This is especially important during the insertion and removal of the containers from the tubes. This will generally mean that thicker material will have to be used. The need to use thicker material will increase the manufacturing cost of the carrier.

Further, the use of thicker material to manufacture the perforated inner and outer walls will increase the pressure drop of the gas flowing through the thicker perforated walls. This will generally result in an increased operating cost since in most cases the gas must be compressed to overcome the pressure drop. Having to compress the gas will increase the energy requirements of the process.

A still further drawback is that where the perforated inner and outer walls are fabricated from thicker material they take up more volume within the carrier. Whilst this may not have a significant effect where larger carriers are used, such as those having a diameter of about 3 inches (7.62 cm) or more, for smaller containers, such as those having a diameter of about 1 (2.54 cm) to about 2 inches (5.08 cm), if a material having a thickness of about 2 mm is used for the manufacture of the perforated walls, 8 mm of the available internal diameter will be taken up with the perforated walls. This then limits the amount of catalyst which can be located within the carrier and hence will limit the amount of reaction that can be achieved.

In addition, if there is any flex in a radial direction in the inner perforated wall, the outer perforated wall or both perforated walls, then additional compressive loads will be imposed on the catalyst particles. It is therefore necessary to use a catalyst with a crush strength which is high enough to avoid the catalyst being crushed by the weight of the filled carriers located above it in the reactor tube. Whilst the crush strength required will be less than that required with conventional filled tubes, it would still be desirable to provide a catalyst carrier that is configured such that the compressive strength of the catalyst does not have to be considered when selecting the catalyst.

An alternative catalyst carrier for use where the catalyst is a monolith catalyst is disclosed in WO2012/136971. In this arrangement, the catalyst carrier comprises:
  a container for holding a monolith catalyst in use, said container having a bottom surface closing the container and a skirt extending upwardly from the bottom surface of said container to a position below the location of a seal and spaced therefrom, said skirt being positioned such that there is a space between an outer surface of the monolith catalyst and the skirt; and
  a seal located at or near a top surface of the monolith catalyst and extending from the monolith catalyst by a distance which extends beyond an outer surface of the skirt.

Thus in this arrangement there is no perforated inner or outer wall and the weight of the stack of carriers and catalysts must be borne by the monolith catalyst itself. This places additional constraints on the composition of the monolith catalyst which can be used. If the thickness of the walls within the monolith has to be increased to provide the necessary strength, the voidage within the monolith will be reduced. This will decrease the free area for gas flow and an increase in pressure drop may result.

A further problem with the catalyst carriers for both particulate and monolith catalysts is that as the upwardly extending skirt from the bottom surface of the container is only connected to the carrier at or near the bottom surface, it may, depending on its thickness, flex in one direction and no longer be concentric within the reactor tube. If the skirt is distorted such that it becomes ovoid at the top then the flow of reactants will be preferentially down the larger gap which will result in poorer heat transfer.

Whilst the skirt could be fabricated from thicker material to minimise the risk of distortion, this will increase production costs and increase the weight of the carrier. In addition, the carrier will be more difficult to fabricate since it is harder to roll thicker material into a perfect cylinder.

It is therefore desirable to provide an improved catalyst carrier in which one or more of the above-mentioned problems can be addressed and preferably overcome.

The present invention solves the above problems by the provision of a catalyst carrier in which the upwardly extending skirt of the prior art is extended so that it joins the surface closing the bottom of the tube and the top surface. Thus the skirt of the prior art carriers becomes the outer wall of the carrier. Apertures will be provided towards the top of the outer wall to allow the fluid flow. Thus in the catalyst carriers of the present invention, the primary load bearing section of the catalyst carrier is the outer wall. In some arrangements, the load will be carried by the top surface, the base and the outer wall. By this means the problems noted with the prior art arrangements may be addressed and preferably are obviated.

Thus according to the present invention there is provided a catalyst carrier for insertion in a reactor tube of a tubular reactor, said catalyst carrier comprising:
  a container for holding catalyst in use, said container having a bottom surface closing the container, and a top surface;
  a carrier outer wall extending from the bottom surface of said container to the top surface;
  a seal extending from the container by a distance which extends beyond the carrier outer wall;
  said carrier outer wall having apertures located below the seal.

In one arrangement, which is particularly suitable where the catalyst is a particulate or a foamed catalyst, the catalyst carrier comprises:
  an annular container for holding catalyst in use, said container having a perforated inner container wall defining an inner channel, a perforated outer container wall, a top surface closing the annular container and a bottom surface closing the annular container;
  a surface closing the bottom of said inner channel formed by the inner container wall of the annular container.

For the avoidance of doubt, any discussion of orientation, for example terms such as upwardly, below, lower, and the like have, for ease of reference, been discussed with regard to the orientation of the catalyst carrier as illustrated in the accompanying drawings. However, the catalyst carrier of the present invention could also be used in an alternative orientation for example horizontally. Thus the terms should be constructed accordingly.

The catalyst carrier will generally be sized such that it is of a smaller dimension than the internal dimension of the reactor tube into which it is to be placed in use. The seal will be sized such that it interacts with the inner wall of the reactor tube when the catalyst carrier of the present invention is in position within the reactor tube. Parameters such as carrier length and diameter will be selected to accommodate different reactions and configurations.

In use in a vertical reactor with downflow, reactant(s) flow downwardly through the reactor tube and thus first contact the upper surface of the catalyst carrier. Since the seal blocks the passage of the reactant(s) around the side of the carrier, the top surface thereof directs them into the inner channel defined by the inner container wall. The reactant(s) then enters the annular container through the perforated inner container wall and then passes radially through the catalyst bed towards the perforated outer container wall. During the passage from the inner container wall to the outer container wall, the reactant(s) contact the catalyst and reaction occurs. Unreacted reactant and product then flow out of the container through the perforated outer container wall. The carrier outer wall then directs reactant and product upwardly between the inner surface of the carrier outer wall and the perforated outer container wall of the annular container until they reach the apertures in the carrier outer wall. They are then directed through the apertures located in the carrier outer wall and flow downwardly between the outer surface of the carrier outer wall and the inner surface of the reactor tube where heat transfer takes place.

The top surface of the container may be of any suitable size and configuration. In the arrangement where the carrier comprises an perforated inner and outer container wall, the top surface will at least extend outwardly from the perforated outer container wall and will connect with the carrier outer wall. In one alternative arrangement the top surface may extend from the perforated inner container wall to the carrier outer wall. It will be understood that the top surface may be an annulus which extends from a point between the location of the perforated inner container wall and the perforated outer container wall to the carrier outer wall.

In one arrangement, a cap may close the inner channel formed by the perforated inner container wall. This cap will include one or more apertures to allow for fluid flow into the inner channel.

The size of the perforations in the inner container wall and the outer container wall will be selected such as to allow uniform flow of reactant(s) and product(s) through the catalyst while maintaining the catalyst within the container. It will therefore be understood that their size will depend on the size of the catalyst particles being used. In an alternative arrangement the perforations may be sized such that they are larger but have a filter mesh covering the perforations to ensure catalyst is maintained within the annular container. This enables larger perforations to be used which will facilitate the free movement of reactants without a significant loss of pressure.

It will be understood that the perforations may be of any suitable configuration. Indeed where a wall is described as perforated all that is required is that there is means to allow the reactants and products to pass through the walls. These may be small apertures of any configuration, they may be slots, they may be formed by a wire screen or by any other means of creating a porous or permeable surface.

Although the top surface closing the container will generally be located at the upper edge of the inner container wall and/or the outer container wall, it may be desirable to locate the top surface below the upper edge such that a portion of the upper edge of the carrier outer wall extends above the top surface. Similarly, the bottom surface may be located at the lower edge of the inner container wall and/or the outer container wall or it may be desirable to locate the bottom surface such that it is above the bottom edge of the outer container wall such that it extends below the bottom surface. Where the carrier outer wall extends above the top and/or the bottom surface, this may facilitate the stacking of containers against others when in use. Additionally or alternatively, this configuration may be configured to facilitate connecting the catalyst carrier to adjacent catalyst carriers in use.

The bottom surface of the annular container and the surface closing the bottom of the inner channel may be formed as a single unit or they may be two separate pieces connected together. The bottom surface of the annular container and the surface closing the bottom of the inner channel may be coplanar but in one arrangement, they are in different planes. In one arrangement, the surface closing the bottom of the inner channel is in a lower plane than the bottom surface of the annular container. This may serve to assist in the location of one catalyst carrier onto a catalyst carrier arranged below it when a plurality of catalyst carriers are to be used. It will be understood that in an alternative arrangement, the surface closing the bottom of the inner channel may be in a higher plane that the bottom surface of the annular container. This may assist in the location of one carrier onto a carrier arranged below it.

Whilst the bottom surface will generally be solid, it may include one or more drain holes. Where one or more drain holes are present, they may be covered by a filter mesh. Similarly a drain hole, optionally covered with a filter mesh may be present in the surface closing the inner channel. Where the carrier is to be used in a non-vertical orientation, the drain hole, where present will be located in an alternative position i.e. one that is the lowest point in the catalyst carrier when in use.

One or more spacer means may extend downwardly from the bottom surface of the catalyst carrier. The, or each, spacer means may be formed as separate components or they may be formed by depressions in the bottom surface. Where these spacer means are present they assist in providing a clear path for the reactants and products flowing between the bottom surface of the first carrier and the top surface of a second lower carrier in use. The spacer may be of the order of about 4 mm or about 5 mm to about 6 mm to about 25 mm deep. Alternatively, or additionally, spacer means may be present on the top surface.

The top surface may include on its upper surface means to locate the catalyst carrier against a catalyst carrier stacked above the carrier in use. The means to locate the carrier may be of any suitable arrangement. In one arrangement it comprises an upstanding collar having apertures or spaces therein to allow for the ingress of reactants.

In an alternative arrangement, which is particularly suitable for a monolith catalyst, the container is configured for holding a monolith catalyst in use.

In one arrangement, the monolith catalyst is a solid, in that there is substantially no space within the body of the monolith that is not occupied by catalyst. When the monolith is in use in a vertical reactor with downflow, the reactant(s) flow downwardly through the reactor tube, the reactant(s) first contacts the upper face of the monolith catalyst and flows therethrough in a direction parallel to the axis of the catalyst carrier. The seal of the container prevents the reactant(s) from flowing around the monolith and assists the direction of the reactants into the catalyst. Reaction will then occur within the monolith catalyst. The product will then also flow down through the monolith in a direction parallel to the axis of the catalyst carrier.

In the arrangement where the catalyst is a monolith catalyst, the top surface will at least extend outwardly from the monolith catalyst and will connect with the carrier outer wall. It will be understood that the top surface may be an annulus which extends over at least a portion of the monolith catalyst to the carrier outer wall Once the reactant(s) and product reach the bottom surface of the container they are directed towards the carrier outer wall. To facilitate this flow, feet may be provided within the container on the upper face of the bottom surface such that, in use, the catalyst monolith is supported on the feet and there is a gap between the bottom of the catalyst monolith and the bottom surface of the container. The carrier outer wall directs the reactant(s) and product upwardly between the inner surface of the carrier outer wall and the outer surface of the monolith catalyst until they reach the underside of the top surface. They are then directed by the underside of the top surface, through the apertures in the carrier outer wall and they then flow downwardly between the outer surface of the carrier outer wall and the inner surface of the reactor tube where heat transfer takes place.

In one arrangement, the monolith catalyst has a channel extending longitudinally therethrough. Generally the channel will be located on the central axis of the monolith catalyst. Thus where the reactor tube is of circular cross-section, the monolith catalyst of this arrangement will be of annular cross-section. In this arrangement, in use, in a vertical reactor with downflow, reactant(s) flow downwardly through the reactor tube and thus first contacts the upper surface of the top surface of the container and are directed into the channel of the monolith. The reactant(s) then enters the annular monolith catalyst and passes radially through the catalyst towards the outer surface of the catalyst monolith. During the passage through the catalyst monolith reaction occurs. Unreacted reactant and product then flow out of the monolith catalyst though the outer surface thereof. The carrier outer wall then directs reactant and product upwardly between the inner surface of the carrier outer wall and the outer surface of the monolith catalyst until they reach the top surface. They are then directed, by the underside of the top surface, through the apertures in the carrier outer wall and flow downwardly between the outer surface of the carrier outer wall and the inner surface of the reactor tube where heat transfer takes place.

In the arrangement in which the monolith catalyst includes the channel, the top surface may extend over the monolith catalyst but leave the channel uncovered. In another arrangement, the top surface may extend across the channel but will include apertures in this region to allow for fluid flow.

It will be understood that where the reactor is an upflow reactor or is, for example, in a horizontal orientation, the flow path will differ from that described above. However, the principle of the path through the catalyst carrier will be as described.

Generally, a plurality of catalyst carriers will be stacked within a reactor tube. In this arrangement, the reactants/products flow downwardly between the outer surface of the outer wall of a first carrier and the inner surface of the reactor tube until they contact the top surface and seal of a second catalyst carrier and are directed downwardly into the second catalyst carrier. The flow path described above is then repeated.

The catalyst carrier may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions.

The inner container wall and/or the outer container wall can be of any suitable thickness. Suitable thickness will be of the order of about 0.1 mm to about 1.0 mm. In one arrangement it may be of the order of about 0.3 mm to about 0.5 mm. The catalyst carrier outer wall may be of a higher thickness than the walls forming the perforated inner and outer container walls when present. As the perforated inner container wall and/or the outer container wall where present are not load bearing in the present invention, they can be made of thinner material than was possible in the prior art arrangements. This will enable them to be more readily fabricated and hence cheaper.

In the arrangement where the monolith catalyst has the longitudinal channel, the surface closing the bottom of the channel and the bottom of the container may be formed as a single unit or they may be two separate pieces connected together. The two surfaces may be coplanar but in a preferred arrangement, they are in different planes. In one arrangement, the portion closing the bottom of the channel in the monolith catalyst is in a lower plane than the bottom surface of the remainder of the container. This serves to assist in the location of one catalyst carrier onto a catalyst carrier arranged below it when a plurality of containers are to be used. It will be understood that in an alternative arrangement, the surface of the bottom closing the channel in the monolith catalyst may be in a higher plane that the bottom surface of the remainder of the container.

In this arrangement, whilst the bottom surface will generally be solid, it may include one or more drain holes. Where one or more drain holes are present, they may be covered by a filter mesh. Similarly a drain hole, optionally covered with a filter mesh, may be present in the surface closing the bottom of the inner channel. Where the catalyst carrier is to be used in a non-vertical orientation, the drain hole, where present, will be located in an alternative position i.e. one that is the lowest point in the carrier when in use.

One or more spacer means may extend downwardly from the bottom surface of the container. The, or each, spacer means may be formed as separate components or they may be formed by depressions in the bottom surface. Where these spacer means are present they assist in providing a clear path for the reactants and products flowing between the bottom surface of the first catalyst carrier and the top surface of a second lower catalyst carrier in use. The spacer may be of the order of about 4 mm or about 5 mm to about 6 mm to about 25 mm deep. Alternatively, or additionally, spacer means may be present on the top surface or may extend upwardly from the seal.

The seal or the top surface may include on its upper surface means to locate the catalyst carrier against a catalyst carrier stacked above the carrier in use. The means to locate the carrier may be of any suitable arrangement. In one arrangement it comprises one or more upstanding collars having apertures or spaces therein to allow for the ingress of reactants. The means may act as baffles to direct the flow.

Whichever arrangement is used for the catalyst carrier, a collar may extend upwardly from the top surface which in use will locate against the under surface of a catalyst carrier stacked above. This collar will generally include apertures to allow, in use, flow therethrough. In one arrangement, the collar will be collinear with the carrier outer wall as this will maximise the strength of the catalyst carrier.

Whichever arrangement is used for the catalyst carrier, the carrier outer wall may be smooth or it may be shaped. If it is shaped, any suitable shape may be used. Suitable shapes include pleats, corrugations, and the like. The pleats, corrugations and the like will generally be arranged longitudinally along the length of the carrier. The shaping of the carrier outer wall increases the surface area of the carrier outer wall and assists with the insertion of the catalyst carrier into the reactor tube since it will allow any surface roughness on the inner surface of the reactor tube or differences in tolerances in reactor tubes to be accommodated.

The apertures in the carrier outer wall may be of any configuration. However, their number, size, configuration, and location will be selected to ensure that the flow of the reactant(s) and products is not impeded while ensuring the carrier outer wall has sufficient material retained to provide the required strength for load bearing. In one arrangement, the apertures may be holes or slots.

The apertures will be of any suitable size and spacing. The selection of suitable sizes will depend on the intrinsic strength of the material from which the catalyst carrier is made, the thickness of material used, the weight and number of catalyst carriers which are to be stacked in a reactor tube, the pressure drop noted, the length of the reactor tube, and the like. In one arrangement, the dimensions of the apertures may be different for different catalyst carriers in a reactor tube. Thus in one arrangement, a catalyst carrier to be located, in use, towards the top of a reactor tube may have the region in which the apertures are located be made of up to 90% apertures whereas a catalyst carrier designed to be located towards the bottom of the reactor tube may have only about 10% of the area as apertures. This is because the catalyst carriers located toward the bottom of a reactor tube will be carrying significantly more weight than those located at the top. The skilled man will readily be able to calculate the dimensions and shape of the apertures taking into account the amount of wall which is required to be retained to provide the necessary structural integrity and support.

The wall material where the apertures are located in the carrier outer wall may be removed or may be left partially attached to the carrier outer wall. In this arrangement the position of the material can be selected to induce direction for the fluid flow. In one example, the apertures may be slots and the material removed, such as by being punched out to form the slots, can be left attached on at least one of the four edges of the slot. The material may be angled outwards so that as the fluid flows out of the catalyst carrier through the slot it is deflected and a swirl flow pattern is induced in the space between the outer surface of the carrier outer wall and the inner surface of the reactor tube. Swirling the fluid in this way will increase the gas velocity and further enhance the heat transfer achieved as the fluid flows down the rector tube wall. In one alternative arrangement, the removed material may be used to strengthen the carrier outer wall where the material remains. For example, the removed material may be left partially attached and then bent around the attachment to lay on the remaining wall thereby thickening and hence strengthening that section of the wall.

Without wishing to be bound by any theory, it is believed that the carrier outer wall serves to gather the reactants/products from the perforated outer wall of the container or monolith catalyst and direct them towards the top of the catalyst carrier collecting more reactants/products exiting from the outer wall of the container or monolith catalyst as they move upwardly. As described above, reactants/products are then directed down between the reactor tube wall and the outside of the carrier outer wall. By this method the heat transfer is enhanced down the whole length of the catalyst carrier but as the heat exchange is separated from the catalyst, hotter or colder as appropriate heat exchange fluid can be used without quenching the reaction at the reactor tube wall and at the same time ensuring that the temperature of the catalyst towards the centre of the container is appropriately adjusted.

The seal may be formed in any suitable manner. However, it will generally be sufficiently compressible to accommodate the smallest diameter of the reactor tube. The seal will generally be a flexible, sliding seal. In one arrangement, an O-ring may be used. A compressible split ring or a ring having a high coefficient of expansion could be used. The seal may be formed of any suitable material provided that it can withstand the reaction conditions. In one arrangement, it may be a deformable flange extending from the carrier outer wall or the top surface of the catalyst carrier. The flange may be sized to be larger than the internal diameter of the reactor tube such that as the catalyst carrier is inserted into the reactor tube it is deformed to fit inside and interact with the reactor tube.

Since in the present invention the carrier outer wall is restricted at both ends by being connected to the base and to the top surface the carrier outer wall cannot be distorted. This ensures that the catalyst carrier will remain centrally located within the reactor tube with a constant gap between the carrier outer wall and the inner wall of the reactor tube.

It will be understood that whilst the carrier outer wall is described as extending from the bottom surface to the top surface, the carrier outer wall may continue above the seal. Thus the seal can be located at the top of the carrier, optionally as part of the top surface, or it may be located at a suitable point on the carrier outer wall provided that it is located above the apertures in the carrier outer wall. Having flexibility in where the seal can be located means that the seal can be thicker than in prior arrangements and provide greater contact area with the reactor tube wall and therefore increase the amount of sealing available.

One advantage of the present invention is that catalyst can be provided to the user within the carriers of the present invention which can then be readily installed within the reactor tubes with minimum downtime. Thus catalyst may be loaded into the catalyst carrier at the catalyst manufacturing site. It may be pre-reduced and stabilised or encapsulated obviating the need for catalyst handling on site. Once the catalyst is spent, the carriers can be readily removed from the reactor as discrete units and readily transported for disposal or regeneration as appropriate.

The apertures in the carrier outer wall can be sealed, for example using tape, for transportation. This can be important to retain the catalyst under an inert atmosphere or to protect operatives from the catalyst. The seal will then be removed before use. Similarly the top of the carrier may be sealed.

A further advantage of the present invention is that the problems noted in prior art arrangements in ensuring that each reactor tube of a tubular reactor are equally filled are obviated.

The catalyst carrier of the present invention allows catalyst to be used in medium to highly exothermic or endothermic reactions. The device allows the use of large reactor tubes leading to large weight and cost reductions for a reactor of a given capacity since heat transfer effectively takes place in a micro-channel zone at the reactor tube wall. This gives excellent heat transfer to or from the cooling/heating medium. Furthermore, as the catalyst is separated from the cooling/heating medium, a larger temperature difference can be allowed as the heat exchange effect is separated from the reaction. Where a plurality of catalyst carriers of the present invention is inserted into a reactor tube this effectively provides a plurality of adiabatic reactors in series in each reactor tube.

The catalyst carrier may be used in a wide range of processes. Examples of suitable processes include reactors for exothermic reactions such as reactions for the production of methanol, reactions for the production of ammonia, methanation reactions, shift reactions, oxidation reactions such as the formation of maleic anhydride and ethylene oxide, Fischer-Tropsch reactions, and the like. Endothermic reactions such as pre-reforming, dehydrogenation and the like can be carried out in reactors including the catalyst carriers of the present invention.

The catalyst carriers of the present invention may include the temperature measuring arrangements described in GB1401518.4, the contents of which are incorporated by reference.

The catalyst carrier of the present invention may be filled or partially filled with any suitable catalyst.

According to a second aspect of the present invention there is provided a reactor tube comprising a plurality of catalyst carriers of the above-mentioned first aspect of the present invention.

According to a third aspect of the present invention there is provided a reactor comprising one or more of the reactor tubes of the above second aspect.

According to a fourth aspect of the present invention there is provided a process for carrying out a reaction wherein the reactants enter into a catalyst carrier of the above first aspect, a reactor tube of the above second aspect, or a reactor of the above third aspect.

The flow of reactants through the cataylst bed is preferably radial.

The present invention will now be described, by way of example, with reference to the accompanying drawings in which.

Figure 1:
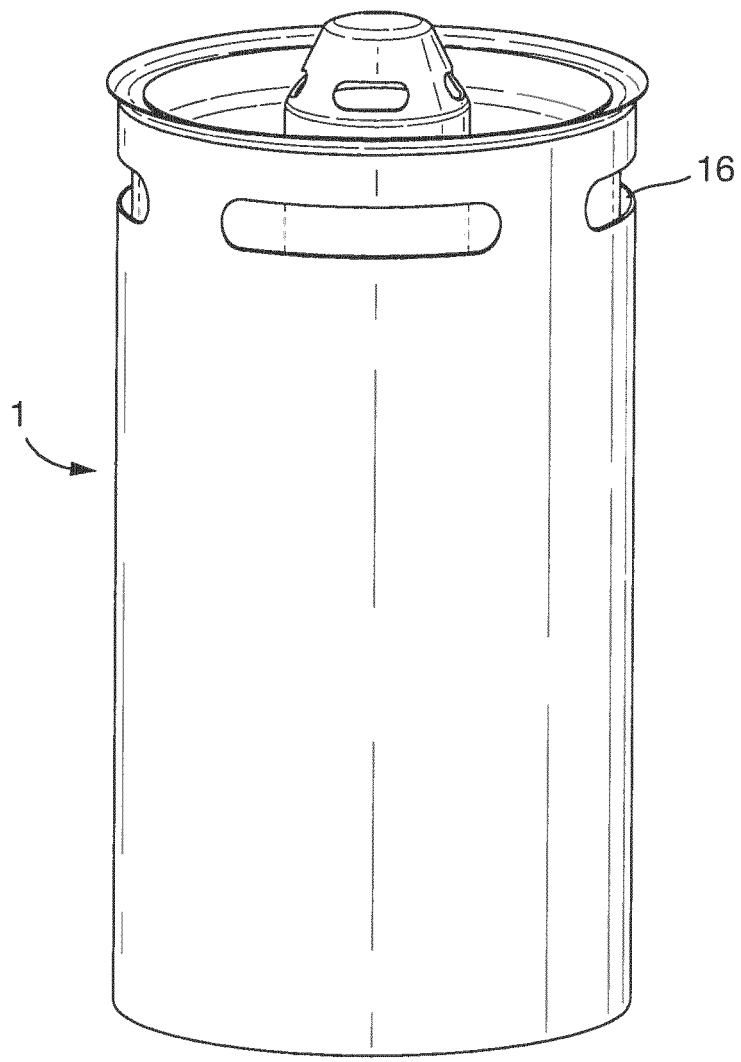
FIG. 1 is a perspective view of one embodiment of the catalyst carrier of the present invention.
Figure 2:
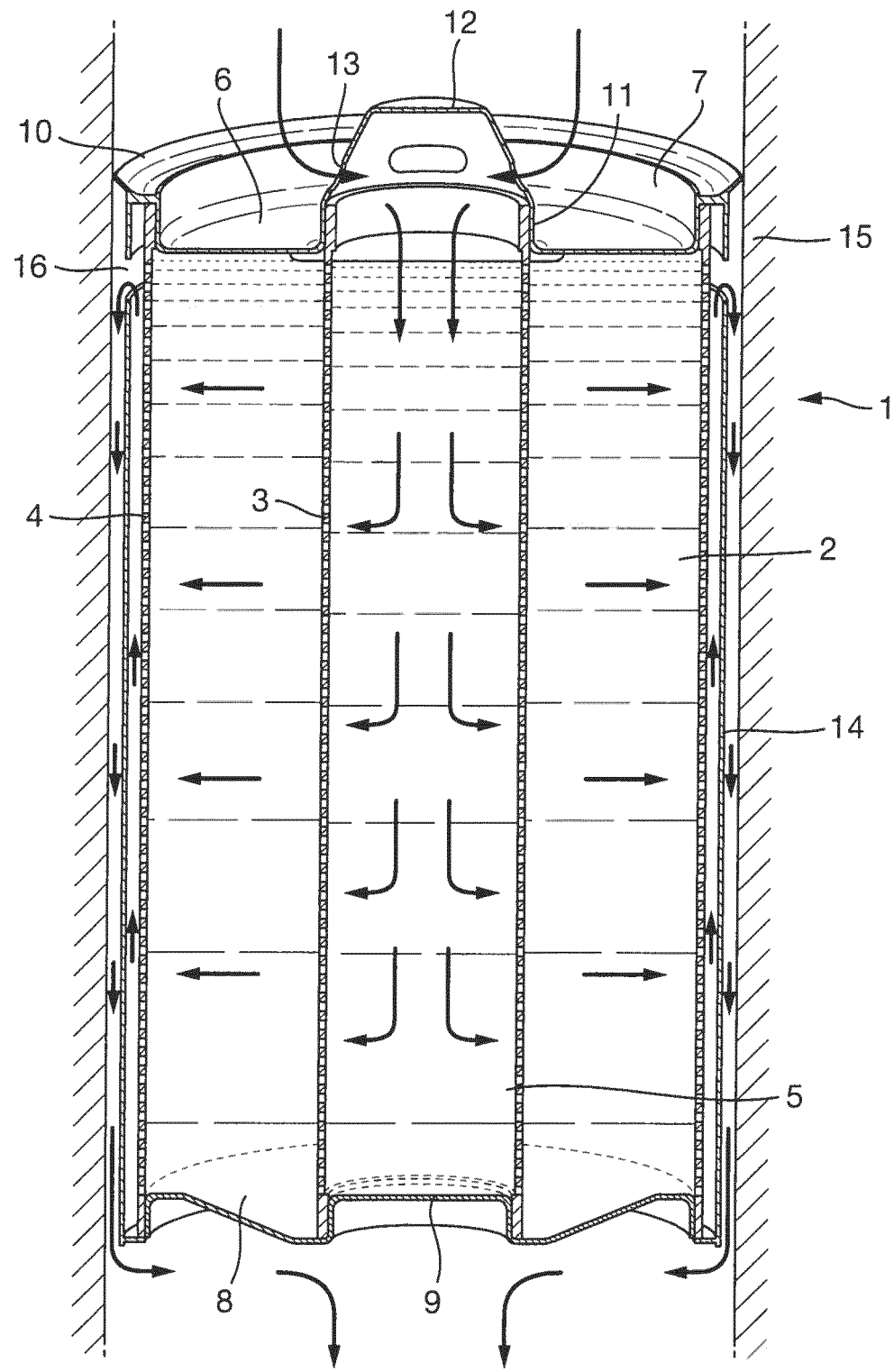
FIG. 2 is a cross section viewed from the side.
Figure 3:
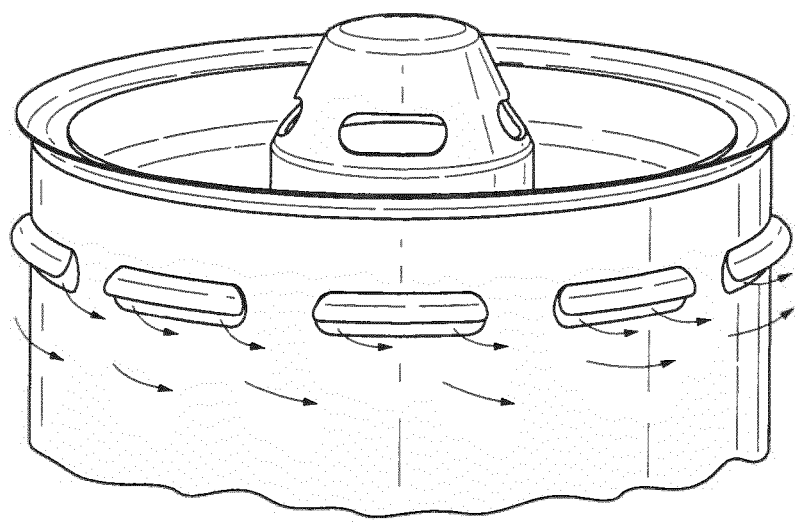
FIG. 3 is a perspective view of one configuration of apertures of the carrier outer wall.

One example of a catalyst carrier 1 of the present invention is illustrated in FIGS. 1 to 3. The carrier 1 comprises an annular container 2 which has perforated inner and outer container walls 3, 4. The perforated wall 3 defines an inner channel 5. A top surface 6 closes the annular container at the top. It is located at a point towards the top of the inner and outer container walls 3, 4 of the annular container 2 such that a lip 7 is formed. A bottom surface 8 closes the bottom of the annular container 2 and a surface 9 closes the inner channel 5 formed by the inner container wall 3. The surface 9 is located in a higher plane that that of the bottom surface 8.

A seal 10 extends from the upper surface 6 and an upstanding collar 11 is provided coaxial with the inner channel 5.

A cap 12 closes the top of inner channel 5. Apertures 13 in the cap allow for fluid ingress.

A carrier outer wall 14 surrounds the container 2. Apertures 16 allow fluid egress from the catalyst carrier.

A catalyst carrier 1 of the present invention is located in a reactor tube 15. The flow of gas is illustrated schematically in FIG. 2 by the arrows.

Figure 4:
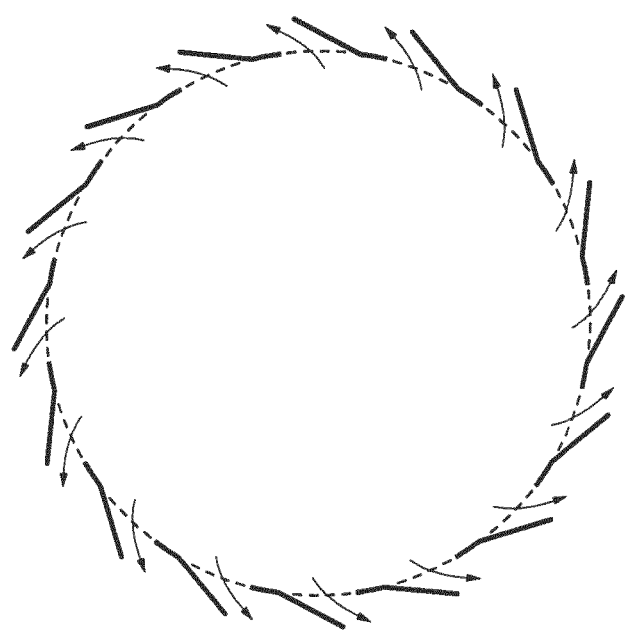
FIG. 4 is a schematic illustration of the gas flow through the apertures.

As illustrated in FIG. 3, some of the carrier outer wall material may be left connected to the carrier outer wall. This flange causes the gas to swirl on its exit from the catalyst carrier as illustrated in FIG. 4.

Figure 5:
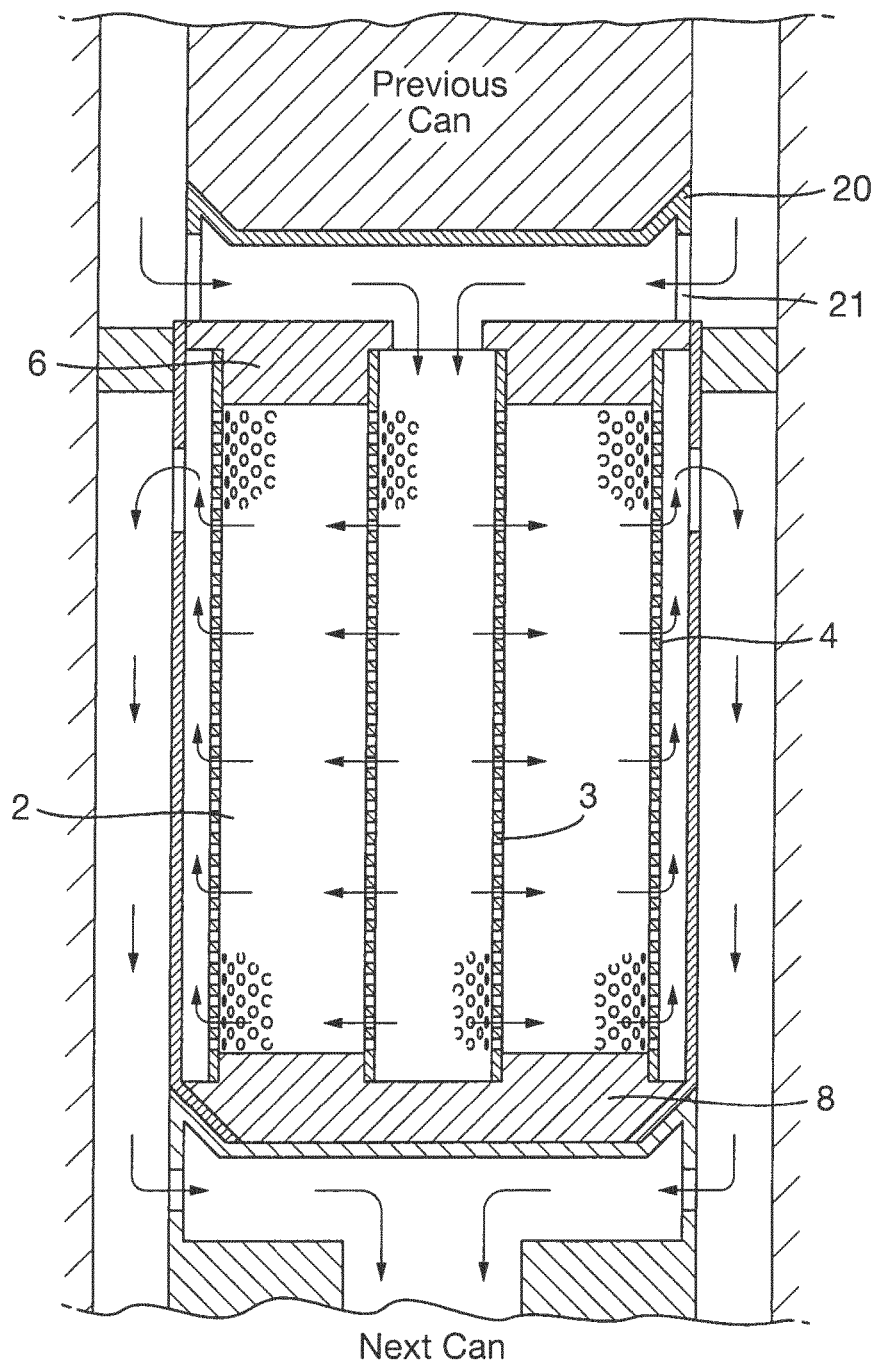
FIG. 5 is a cross section of one alternative arrangement.

In the arrangement illustrated in FIG. 5, a spacer 20 may be located above the catalyst carrier, the side walls of the spacer 20 may be integral with the carrier outer wall or may be a separate item. Apertures 21 are located in the spacer wall to allow flow into the space above the top surface of the catalyst carrier.

In this arrangement, the reactants flow through the apertures 21 in the spacer 20 and into the space above the top surface 6. The flow is then the same as illustrated in FIG. 2.

The invention claimed is:

1. A catalyst carrier for insertion in a reactor tube of a tubular reactor, said catalyst carrier comprising:
    an annular container for holding catalyst in use, said container having a perforated inner container wall defining an inner channel, a perforated outer container wall, a bottom surface closing the annular container, and a top surface closing the annular container;
    a surface closing the bottom of the inner channel formed by the inner container wall of the annular container;
    a carrier outer wall extending from the bottom surface to the top surface;
    a seal extending from the container by a distance which extends beyond the carrier outer wall;
    said carrier outer wall having apertures located below the seal such that one or more reactants enter the annular container through the perforated inner container wall and flow radially towards the perforated outer container wall wherein the carrier outer wall directs reactants and product upwardly between the inner surface of the carrier wall and the perforated outer container wall of the annular container until they reach the apertures in the carrier outer wall.

2. The catalyst carrier according to claim 1, comprising a cap closing the inner channel formed by the perforated inner container wall, said cap including one or more apertures.

3. The catalyst carrier according to claim 1, wherein the carrier outer wall is smooth or shaped.

4. The catalyst carrier according to claim 1, wherein the apertures in the carrier outer wall are slots.

5. The catalyst carrier according to claim 1, wherein the carrier outer wall is comprised of a wall material and the wall material is left partially attached to the carrier outer wall when the apertures are formed.

6. The catalyst carrier according to claim 5, wherein the attached material is configured to induce direction for the fluid flow.

7. The catalyst carrier according to claim 1, additionally including catalyst.

8. A reactor tube comprising a plurality of catalyst carriers of claim 1.

9. A reactor including one or more reactor tubes of claim 8.

10. A process for carrying out a reaction wherein the reactants enter into a catalyst carrier of claim 1.

* * * * *